United States Patent [19]

Baba et al.

[11] Patent Number: 4,735,165
[45] Date of Patent: Apr. 5, 1988

[54] STEERING APPARATUS FOR BOAT

[75] Inventors: Masanao Baba, Takarazuka; Koichi Mori, Hamamatsu, both of Japan

[73] Assignee: Nippon Cable System, Inc., Hyogo, Japan

[21] Appl. No.: 17,410

[22] Filed: Feb. 24, 1987

[51] Int. Cl.⁴ .............................................. B63H 25/06
[52] U.S. Cl. ............................ 114/144 R; 74/501 R; 74/501 P; 440/62
[58] Field of Search ............... 114/144 R; 440/62, 63; 74/82, 487, 501 R, 502; 74/501 D, 501 F

[56] References Cited

U.S. PATENT DOCUMENTS

| | | | |
|---|---|---|---|
| 1,584,435 | 5/1926 | Constantinesco | 74/501 R |
| 2,112,722 | 3/1938 | Weber | 74/502 |
| 2,309,596 | 1/1943 | Johnson | 74/501 R |
| 2,517,705 | 8/1950 | Paquin | 74/501 R |
| 2,875,722 | 3/1959 | Post | 440/62 |
| 3,013,443 | 12/1961 | Morse | 74/501 D |
| 3,021,722 | 2/1962 | Bratz et al. | 74/502 |
| 3,206,998 | 9/1965 | Matz et al. | 114/144 R |
| 4,050,327 | 9/1977 | Thomas et al. | 74/502 |
| 4,261,221 | 4/1981 | Kobayashi | 74/501 D |
| 4,334,438 | 6/1982 | Mochida | 74/501 D |

Primary Examiner—Sherman D. Basinger
Assistant Examiner—Thomas J. Brahan
Attorney, Agent, or Firm—Armstrong, Nikaido, Marmelstein & Kubovcik

[57] ABSTRACT

A steering apparatus for a boat, comprising a steering wheel, a rudder and a push-pull control cable layed between former two, wherein a connecting device, of the push-pull control cable and a steering mechanism on the side of the rudder, comprises a cable cap fixed to a conduit of the push-pull control cable, a guide pipe provided in said steering mechanism, an adjusting nut adjustably engaged to said cable cap and a semi-box nut having an annular bottom to be used for connecting the cable cap and the guide pipe by catching the adjusting nut on the cable cap and simultaneously being engaged to a male-threaded surface of the guide pipe. The adjustment of the effective length of the conduit of the push-pull control cable is easily achieved by the selection of an axial position of the adjusting nut.

3 Claims, 5 Drawing Sheets

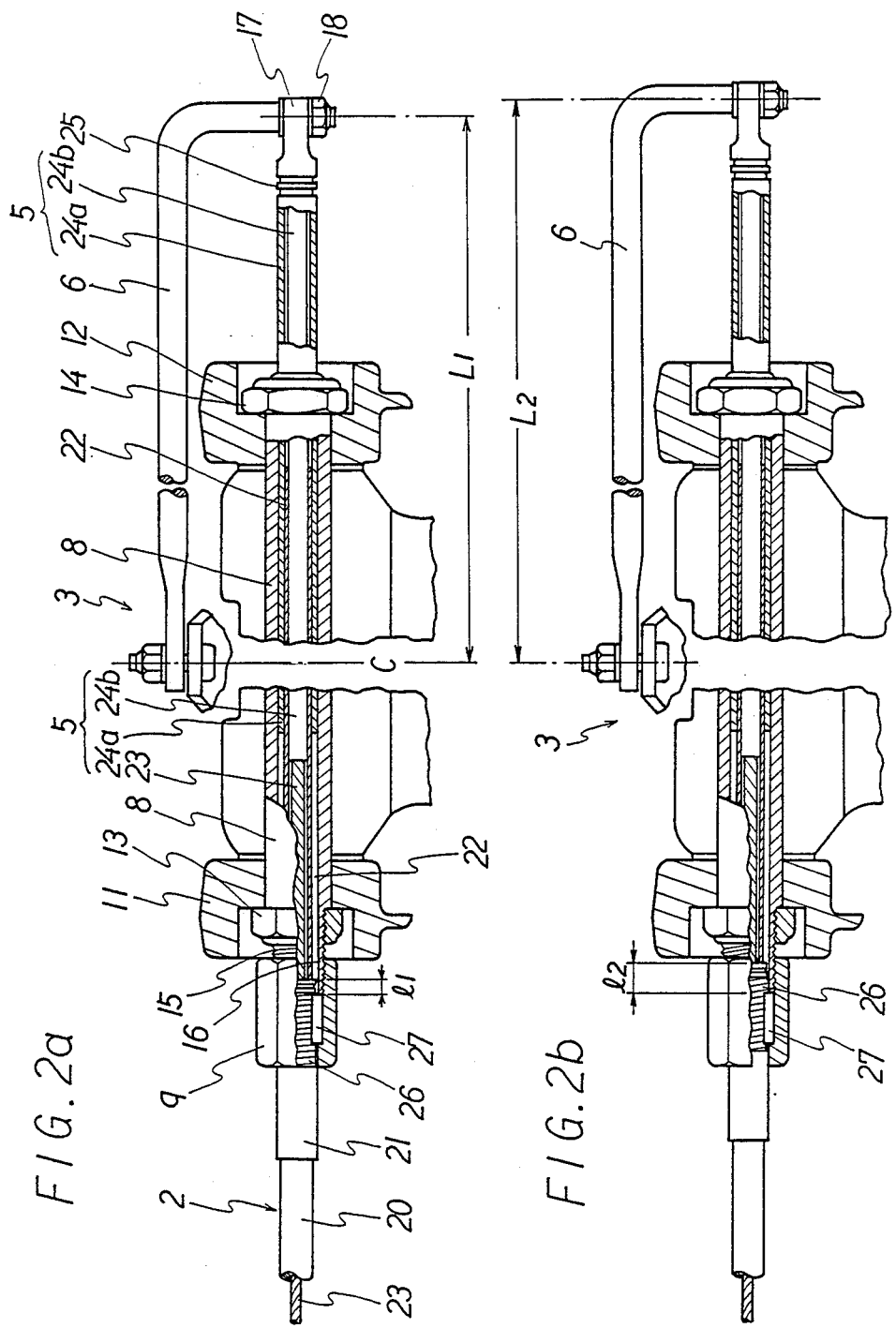

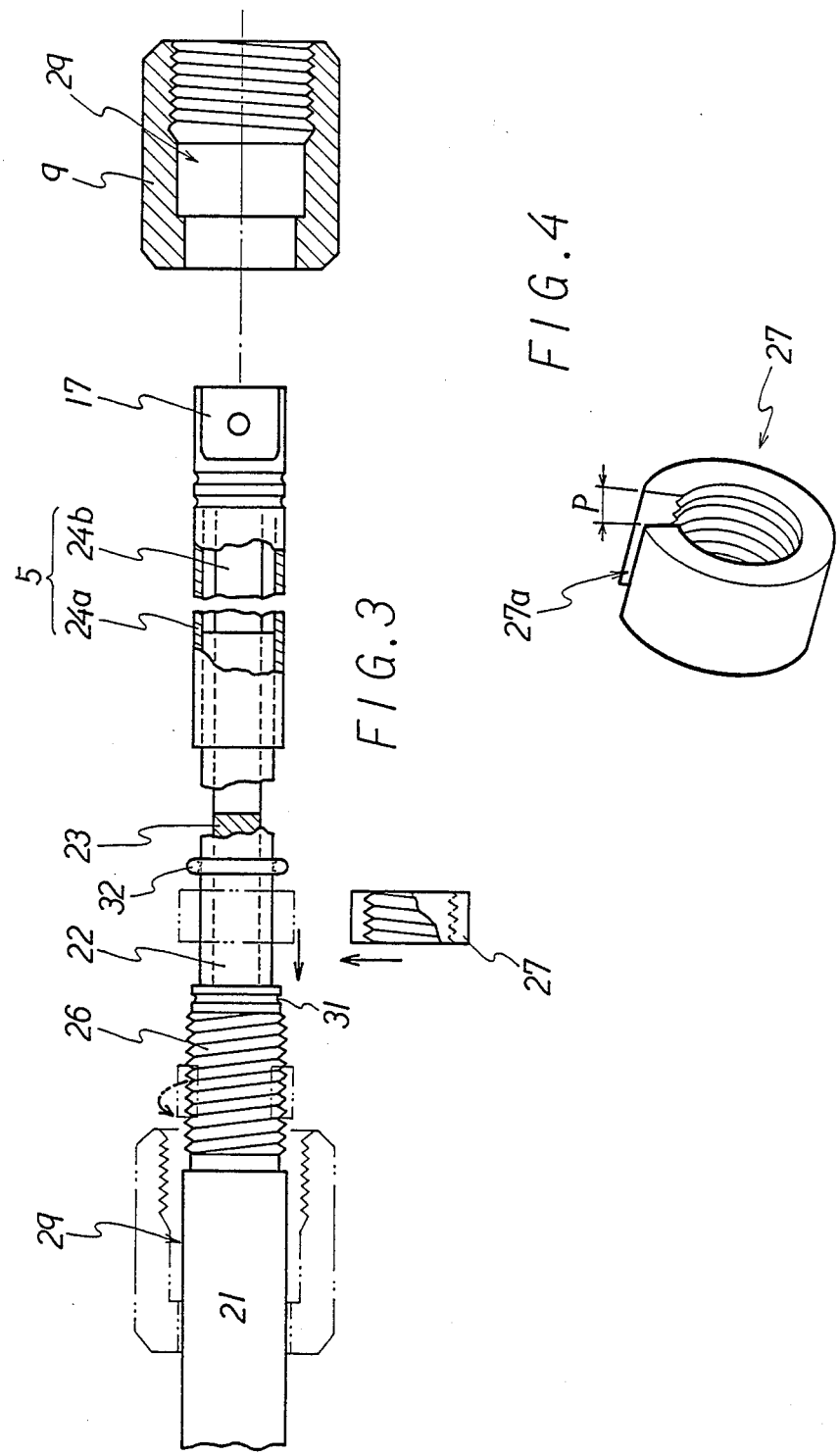

STEERING APPARATUS FOR BOAT

BACKGROUND OF THE INVENTION

The present invention relates to a steering apparatus for a boat, and more particularly, to a steering apparatus for a small boat and the like, in which a steering mechanism can be operated remotely by means of push-pull control cable for transmission of steering force, and steering position adjustment work and assembly/disassembly work of which are easy to perform.

Hitherto, as a steering apparatus for a boat, there was used a steering apparatus using push-pull control cable for transmission of steering force because of its superior remote-operability and space saving effect in a boat.

Fundamental construction of the above-mentioned steering apparatus for a boat is explained hereinafter with reference to FIG. 7.

In FIG. 7, numeral 1 means a steering wheel mounted at an operator's seat of a boat, 2 means a push-pull control cable, 3 means a steering mechanism and 4 means a rudder. The rudder can be substituted by an outboard motor being rotatably mounted on the hull or stern of the boat, of which outline is illustrated by imaginary lines in FIG. 5. In the present specification, a word "rudder means" or "rudder" has a broad concept including such an outboard motor. In the steering apparatus for a boat of FIG. 7, when the steering wheel 1 is rotated, an inner cable of the push-pull control cable 2 is pulled or pushed, then a steering rod 5 in the steering mechanism 3 is moved in the direction shown by arrow a or b. Consequently, the rudder 4 is operated via a steering link 6 connected to the steering rod 5. Although not shown in FIG. 7, one end of the inner cable of the push-pull control cable 2 is connected to a rack-pinion mechanism 7 which is driven by the steering wheel 1, and the other end is connected to the above-mentioned steering rod 5 slidably guided by a guide pipe 8 which is provided in the steering mechanism 3.

In a conventional steering apparatus for a boat, the later end of a conduit of the push-pull control cable 2 is connected to the steering mechanism 3 by connecting a cable cap fixed on the end of the conduit with an end of the guide pipe 8 using a semi-box nut 9, i.e. a nut having an annular bottom.

However, the conventional steering apparatus for a boat described above have the following problems:

(1) The push-pull control cable 2 and the steering rod 5 are manufactured so as to have certain prespecified lengths, then installed on a boat at outfitting stage together with the steering wheel 1 and steering mechanism 3. However, the rack-pinion mechanism 7 on the side of the steering wheel 1 and the steering mechanism 3 are usually associated with manufacturing errors and installation errors. As a result of that, in a completed apparatus, there exists a problem that the straight-forward position of the steering wheel 1 does not make the rudder 4 in the straightforward position to cause some error. Without solving this problem, there is caused an inconvenience in navigating a boat that an operator cannot navigate a boat straightforward with relying on the straightforward position of the steering wheel 1 (e.g. the position in which the spoke 1a is in an upright posture).

(2) In a small boat having limited space availability, sometime the rack-pinion mechanism 7 is installed in an inclined posture, i.e. being rotated in a small angle around the axis of the steering wheel 1. In that case, the angle differs a little depending on the size of the boat. Consequently, many kinds of push-pull control cables 2 having different length are required when the apparatus is applied to a series of different kinds of boats. However, to provide many kinds of push-pull control cables 2 makes the cost increase, then it is undesirable.

(3) A boat has a behavior or tendency of turning right or left a little during the navigation caused by the effect of turning torque of the thruster. Each boat has an individual behavior described above, and that differs a little. However, the correction of the straightforward position of the rudder to compensate above behavior cannot be achieved in the conventional steering apparatus but only the skill of the operator can compensate the behavior.

An object of the present invention is to provide a steering apparatus for a boat in which to adjust the straightforward positions of the steering wheel and the rudder is easy when they are installed in the boat, to apply to different kinds of boats is easy, to compensate a behavior of an individual boat is previously enabled and to assemble and disassemble thereof are easy.

SUMMARY OF THE INVENTION

In accordance with the present invention, there is provided a steering apparatus for a boat comprising an operating means, a push-pull control cable having an inner cable to be pushed or pulled according to an operation of the operating means and a conduit as a guide allowing the inner cable to slide freely, and a steering mechanism having a steering link connected to an end of the inner cable and a rudder means to be operated by the steering link. The steering apparatus also comprises a guide pipe equipped in the steering mechanism, which introduces the inner cable therein and guides the inner cable with allowing it to slide freely, a cable cap fixed to the conduit, for connecting the conduit to an end fitting of the guide pipe, and a semi-box nut engaged to the cable cap. The cable cap has a male-threaded surface at its end, and an adjusting nut is set on the male-threaded surface so that the adjusting nut can move along the axis. The semi-box nut has a hollow for receiving the adjusting nut. The bottom side of the semi-box nut, having a hole for the cable cap to penetrate, pushes the adjusting nut when the semi-box nut is fasten to the end fitting having a male-threaded surface, accordingly the adjusting nut is nipped between the semi-box nut and the end fitting.

In a steering apparatus of the present invention, at the time of connecting a conduit of a push-pull control cable to an end fitting of a guide pipe using a semi-box nut, to set an adjusting nut at a deep point of a male-threaded surface of a cable cap makes the end of the cable cap be inserted into the guide pipe deeply, and consequently the distance between the end of the cable cap and a connecting point of a steering link becomes short. On the contrary, to set the adjusting nut at a shallow point of the male-threaded surface of the cable cap makes the end of the cable cap be inserted into the guide pipe shallowly, and consequently the distance between the end of the cable cap and the connecting point of the steering link becomes long.

Thus, the distance between the end of the cable cap and the connecting point of the steering link can be adjusted within the movable range of the adjusting nut by changing the setting position of the adjusting nut on the male-threaded surface of the cable cap.

Further, providing that an adjusting nut having C-shaped section, which is manufactured by cutting in proper width, is used, the adjusting nut can be fitted laterally, without carring out troublesome works such as fitting work of it from the far free end of the steering rod having an end connected to the inner cable or from the far end of a fixed guide pipe connected to the cable cap. Accordingly, the assembly and disassembly works become easy.

Next, a preferable embodiment of the present invention is explained with reference to the attached drawings.

BRIEF DESCRIPTION OF THE DRAWINGS

FIG. 2a and FIG. 2b are sectional views of the apparatus in FIG. 1a and FIG. 1b being applied respectively to two kinds of steering mechanisms having different center-to-center distances;

FIG. 3 is a view explaining fitting work of an adjusting nut in the present invention;

FIG. 4 is a perspective view showing an embodiment of an adjusting nut in the present invention;

DETAILED EXPLANATION OF THE INVENTION

Figure 7:
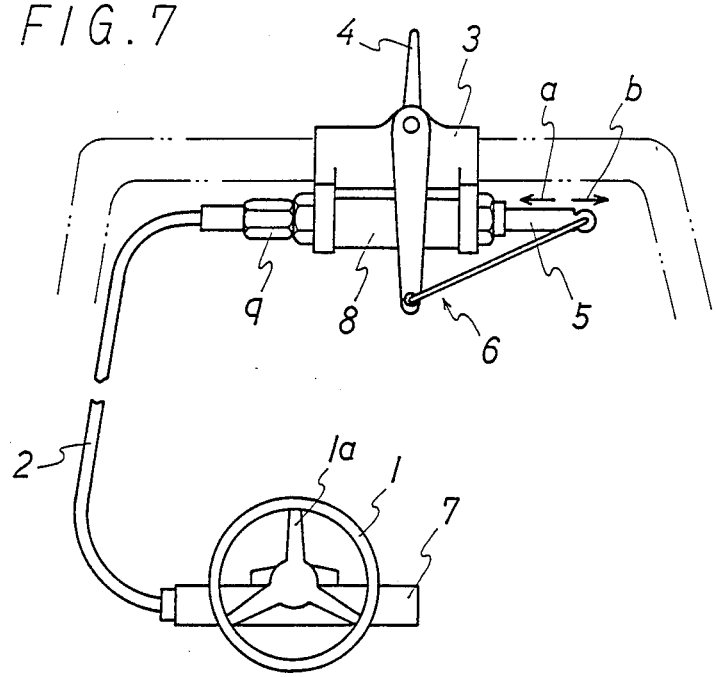
FIG. 7 is a plan view explaining the fundamental construction of a steering apparatus of the present invention.

A steering apparatus of the present invention explained hereinafter has the fundamental construction shown in FIG. 7. Namely, rotative motion of a steering wheel 1 is converted to a linear motion by a rack-pinion mechanism 7 and the like, and an inner cable of a push-pull control cable 2 is pushed or pulled. Since a steering rod 5 is connected to the inner cable, the steering rod 5 is moved in a direction of an arrow a or b by the push-pull operation of the inner cable, then the motion of the steering rod 5 is transmitted to a rudder 4 via a steering link 6 to turn the rudder 4 right or left. Thus in a steering apparatus of the present invention, an operator can perform the steering operation of a boat by rotating the steering wheel 1 which results in a turning of a rudder 4.

In a steering apparatus of the present invention, there is provided an advatageous construction in the connecting part between a conduit of a push-pull control cable 2 and an end of a guide pipe 8. The construction is explained with reference to FIGS. 2a and 1c.

In FIG. 2a, numerals 11 and 12 are brackets provided in a main body of a steering mechanism 3. Through those brackets 11 and 12, there is inserted a hollow guide pipe 8, which is fixed on the brackets 11, 12 so as not to move in axial direction by lock nuts 13, 14 fitted on both sides of the guide pipe 8. At one side (left side in FIG. 2a) of the guide pipe 8, there is provided a longer male-threaded surface than required for the lock nut 13, and the excess length of the threaded part forms an end fitting 16. From the other side (right side in FIG. 2a) of the guide pipe 8, there is inserted a steering rod 5, which is guided by an inner surface of the guide pipe 8 and is capable of sliding in axial direction. The steering rod 5 consists of a hollow cylindrical part 24a and a core rod 24b placed inside the hollow cylindrical part 24a so as to have a common center axis and to form an annular space in section between them. At the left side of the steering rod 5 which is inserted into the guide pipe 8, the hollow cylindrical part 24a and the core rod 24b have free ends, respectively. At the other end 25 (right side), the hollow cylindrical part 24a and the core rod 24b are fixed each other by caulking, welding, brazing or the like, and form an integral part together with an eye-end 17 fixed on the end 25 thereof. The steering rod 5 is connected to the steering link 6 at the eye-end 17 by using a nut 18. The annular space between the hollow cylindrical part 24a and the core rod 24b is a space for slidably receiving a fixed guide pipe 22 described in the following paragraph.

The conduit 20 of the push-pull control cable 2 is connected to the end fitting 16 of the guide pipe 8 by using a semi-box nut 9, the detail of that is mentioned hereinafter. A fixed guide pipe 22 having an end fixed to the cable cap 21 is extended from the cable cap 21 of the push-pull control cable 2, and inserted into the annular space in the steering rod 5 with contacting the inner surface of the hollow cylindrical part 24a and the outer surface of the core rod 24b, thus guides them keeping their free sliding capability. Further, the length of the fixed guide pipe 22 is so determined that it does not reach the end 25 (right end in FIG. 2a) to keep the sliding stroke of the steering rod 5. The inner cable 23 of the push-pull control cable 2 penetrates inside the fixed guide pipe 22 and is extended from the end of the cable cap. The extended length of the fixed guide pipe 22 is slightly longer than that of the sliding stroke of the steering rod 5. The end of the inner cable 23 is connected to the core rod 24b by caulking or the like. The core rod 24b and the inner cable 23 fixed to it are inserted in the fixed guide pipe 22 with allowing free sliding of them.

The construction described above enables the steering rod 5 to slide in axial direction with being guided by the fixed guide pipe 22 when the inner cable 23 is pushed or pulled, and consequently the steering link 6 is moved. The hollow cylindrical part 24a is supported at both outer and inner surfaces by the guide pipe 8 and the fixed guide pipe 22 respectively with being allowed the sliding motion thereof, accordingly it is guided in order to be protected against the buckling. The core rod 24b of the steering rod 5 and the inner cable 23 extended from the conduit 20 are also supported by the fixed guide pipe 22 at their outer surfaces, accordingly they are guided in order to be protected against the buckling. Those guiding function due to the above-mentioned multitelescopic construction enables the steering rod 5 to act smoothly.

Figure 1A:
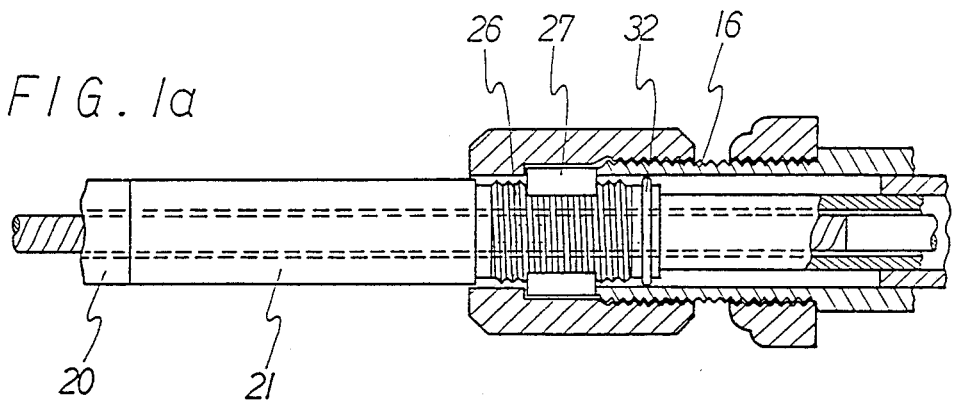
FIG. 1a and FIG. 1b are partially cutaway side views of an important part of an embodiment of the steering apparatus of the present invention showing assembled conditions with different setting positions of an adjusting nut, respectively.
Figure 1B:
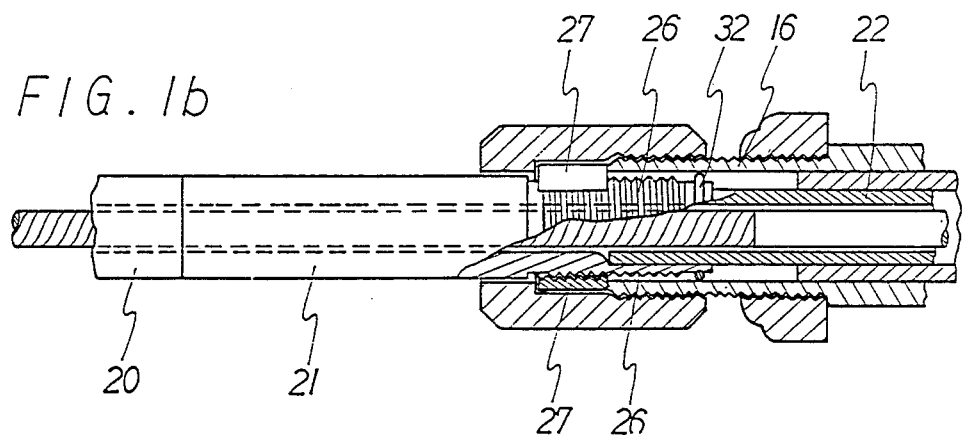
Figure 1C:
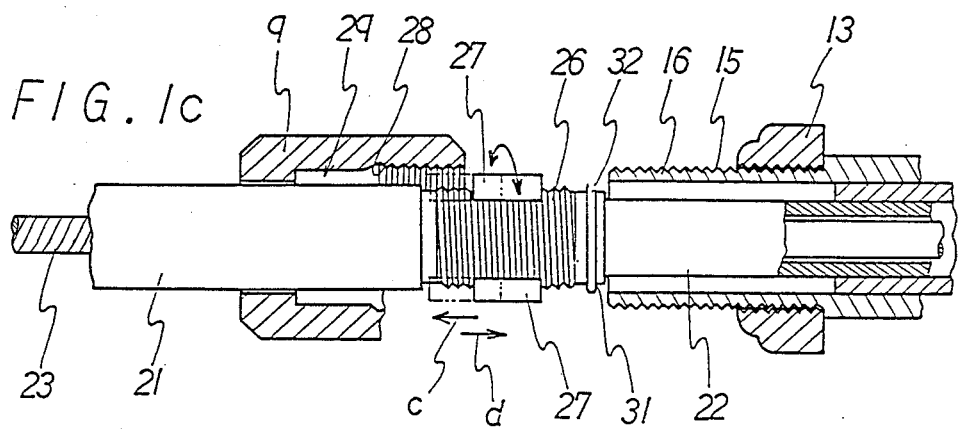
FIG. 1c is a partially cutway side view of the important part of the embodiment in FIG. 1a showing preassembled condition.

Next, the cable cap 21 and its surroundings are explained using FIG. 1c. As shown in FIG. 1c which is a partially cutaway view, there is formed a male-threaded surface 26 at the end of the cable cap 21, and an adjusting nut 27 is fitted thereon. The axial width of the adjusting nut 27 is shorter than the axial length of the male-threaded surface 26. The adjusting nut 27 moves on the male-threaded surface 26 in the direction of arrow c or d when turning it right or left. The outside diameter of the male-threaded surface 26 is slightly smaller than the inside diameter of the end fitting 16, so that it can be inserted into the end fitting 16. The adjusting nut 27 has a form which enable one end of it to contact the end surface of the end fitting 16. The semi-box nut 9 having a female-thread 28 on its open side inner surface has a hollow 29 to enclose the adjusting nut 27, and has a small opening at its bottom so that its inner bottom surface can be in contact with the other end of the adjusting nut 27 while allowing the cable cap 21 to penetrate the bottom. The female-thread 28 is provided for engaging with the male-thread 15 of the end fitting 16, accordingly the semi-box nut 9 can be screwed on the end fitting 16.

When the semi-box nut 9 is screwed on the end fitting 16 in above way, the adjusting nut 27 is nipped at both end by the end surface of the end fitting 16 and the inner bottom surface of the semi-box nut 9. When the cable cap 21 of the push-pull control cable 2 is connected with the guide pipe 8, to set the adjusting nut 27 near the edge of the male-threaded surface 26 makes the cable cap 21 be fixed at shallow position in the end fitting 16. On the contrary, to set the adjusting nut 27 near the inner end of the male-threaded surface 26 makes the cable cap 21 be fixed at deep position in the end fitting 16.

In the steering apparatus for a boat described above as an embodiment, the following water protection means is provided because it is used in an environment where sea water or the like is splashing. An O-ring 32 or a similar seal is equipped at an O-ring groove 31 (see FIG. 3) prepared near the front edge of the cable cap 21, i.e. on an unthreaded surface between the male-threaded surface 26 and the front edge. When the cable cap 21 is inserted into the end fitting 16, the O-ring 32 is tightly in contact with the inner surface of the end fitting 16. As a result of the sealing provided by the O-ring 32 between the cable cap 21 and the end fitting 16, water is prevented from entering into the push-pull control cable 2 or the steering rod 5, consequently a smoothly operating capability of the steering mechanism 3 is maintained for a long time.

The fixed guide pipe 22 is fixed to the front edge of the cable cap 21 as shown in FIG. 1b, and therefore is indirectly connected to the conduit 20. The inner cable runs through the cable cap 21 and the fixed guide pipe 22.

In the apparatus of the present invention, by using the adjusting nut 27 having C-shaped section, the assembly work of the adjusting nut 27 is made easy as explained below using FIG. 3. First, the semi-box nut 9 is put on the eye-end 17 from the bottom side thereof, then the semi-box nut 9 is moved along the steering rod 5, the fixed guide pipe 22 and the male-threaded surface 26 of the cable cap 21 in that order, then the semi-box nut 9 is put on the cable cap 21. Next the O-ring 32 in the O-ring groove 31 on the cable cap 21 is temporarily relocated at the fixed guide pipe 22 keeping a distance longer than the width of the adjusting nut 27 from the interfacing edge of the fixed guide pipe 22 in order to protect the O-ring 32 from being damaged by the adjusting nut 27. Then the adjusting nut 27 having C-shaped section is mounted at the fixed guide pipe 22 laterally and is moved to the cable cap 21 axially and is screwed on the male-threaded surface 26 thereof. Further the adjusting nut 27 is set at a desired position, and the O-ring 32 being temporarily relocated at the fixed guide pipe 22 is refitted on the O-ring groove 32. Finally the semi-box nut 9 is moved to enclose the adjusting nut 27, and the female-threaded surface 28 inside the semi-box nut 9 is engaged with the end fitting 16 of the guide pipe 8.

The cutting 27a of the adjusting nut 27 has been so prepared to have a width P larger than the outside diameter of the fixed guide pipe 8. The fixed guide pipe 22 can be partially prepared to have flat surfaces at the top and the bottom in order to reduce the width P of the cutting 27a. The surfaces of the cutting 27a parallel with each other and parallel with the axis of the adjusting nut 27 are usually preferable, however the two surfaces can form some angle.

The disassembly work for the adjusting nut 27 and the semi-box nut 9 is performed along the reverse order of the above procedure.

The assembly and disassembly work in case of using the adjusting nut without having a cutting is similar to above except that is required the adjusting nut 27 to be inserted through longitudinaly by the eye-end 17, the steering rod 6 and the fixed guide pipe 22.

Next, there are explained length adjusting procedures in the steering apparatus for a boat described above as an embodiment.

First, the procedure in case of using push-pull control cables having the same dimension for steering mechanisms having different dimensions is explained in accordance with FIG. 2a and FIG. 2b. FIG. 2a shows a steering mechanism 3 having a steering link 6 of a short length L1, while FIG. 2b shows a steering mechanism 3 having a steering link 6 of a long length L2, and the both are illustrated so as to have a common center line C. In this case, i.e. the steering links 6 have different center-to-center length, the following manners are employed.

For the steering mechanism 3 having a short center-to-center length L1, the adjusting nut 27 is set near the edge to make the cable cap 21 be inserted a little into the end fitting 16. On the other hand, for the steering mechanism 3 having a long center-to-center length L2, the adjusting nut 27 is set at a deep position to make the cable cap 21 be inserted deeply into the end fitting 16. When those manners are employed, the distance between the connecting point and the edge of the cable cap 21 keeps the same dimention. The connecting point is a point where the steering rod 5 is pivoted to the steering link 6. Therefore, push-pull control cables 2 having the same dimension and steering rods 5 having the same dimension are usable for steering apparatus having different dimensions.

Second, the procedure taken for the correction of dimensional errors in steering apparatus of the same type is explained. Even in the same type of steering apparatus for the same type boat, the distance between the connecting point and the edge of the cable cap 21, which makes the straight-forward position of the steering wheel 1 agree to the straightforward position of the rudder 4, differs due to dimensional errors in manufacturing and installation. Those dimensional errors are corrected by setting the adjusting nut 27 at the desired position within the range of movable length l of the adjusting nut 27 on the male-threaded surface 26. Accordingly, the adjustment of the straightforward position, i.e. to adjust the steering wheel 1 at its straightforward position (e.g. the position in which the spoke 1a is in an upright posture) with keeping the rudder 4 at its straightforward position, becomes easy.

Figure 5:
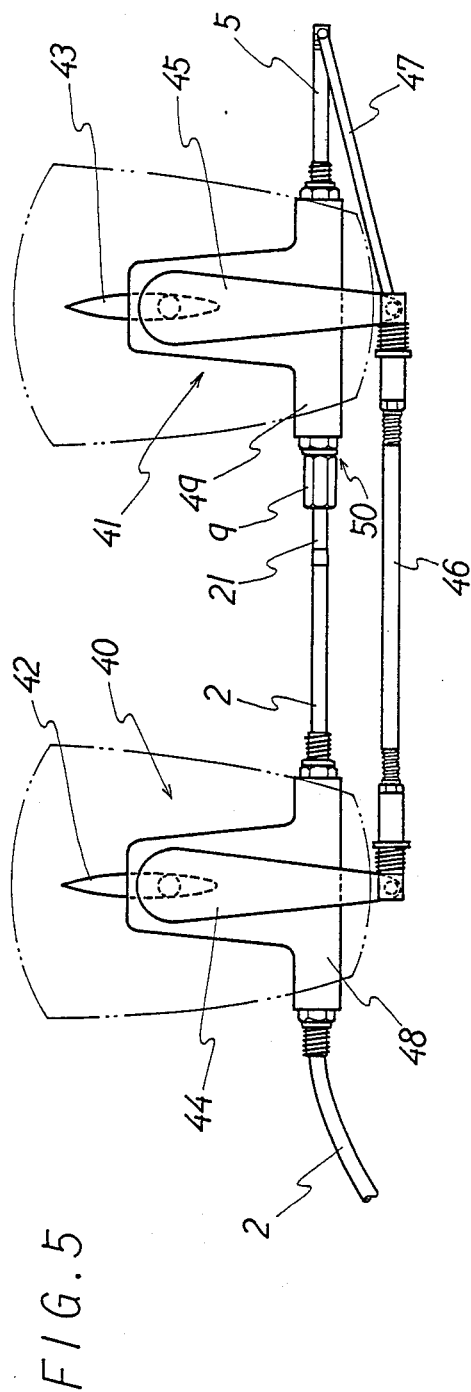
FIG. 5 is a plan view showing an embodiment of a steering apparatus of the present invention.

Further a steering apparatus of the present invention is suitably applied to a boat having two or more steering mechanisms operated by one push-pull control cable. FIG. 5 shows duplex steering mechanisms. Numerals 40 and 41 mean a starboard side steering mechanism and a port side steering mechanism respectively. The imaginary outline shows outboard motors rotatably mounted on the hull of the boat. The steering mechanisms 40, 41 are respectively connected to a starboard side rudder and a port side rudder or to a starboard side outboard motor and a port side outboard motor. The two steering mechanisms are connected each other by a link mechanism which consists of a starboard side arm 44, a port side arm 45, a connecting rod 46 and a bar 47 for the interlocked operation thereof. The steering mechanisms 40, 41 are respectively equipped with guide pipes 48, 49 as shown in FIG. 5.

Figure 6:
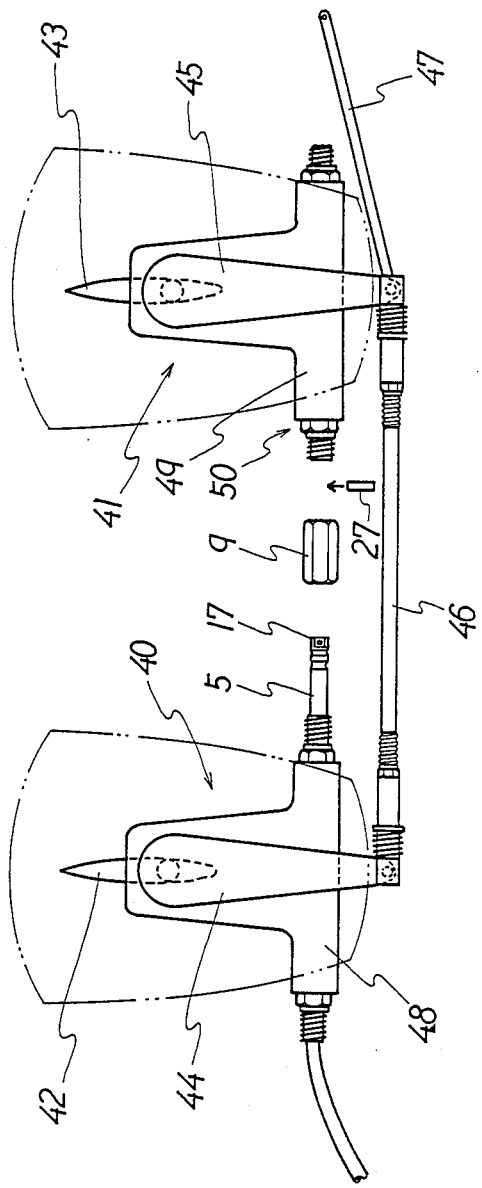
FIG. 6 is a plan view of the embodiment of a steering apparatus in FIG. 5 showing the pre-assembled condition.

In this apparatus, the push-pull control cable 2 for steering runs through first the guide pipe 48 and then is connected to the steering rod 5 which is inserted into the guide pipe 49. The eye-end i.e. the end of the steering rod 5 is connected to the end of the bar 47 which is a part of the link mechanism. Accordingly the conduit of the push-pull control cable 2 is fixed to the center side end 50 of the guide pipe 49 of the port side steering mechanism 41. At this fixing point, the following procedure is taken in order to equip the same mechanism as described above for the adjustment of the fixing length of the push-pull control cable. First the semi-box nut 9 is placed between the guide pipe 48 of the starboard side steering mechanism 40 and the guide pipe 49 of the port side steering mechanism 40 as shown in FIG. 6, the control cable 2 is introduced through the guide pipe 48 and the semi-box nut 9, and the steering rod 5 is introduced through the guide pipe 49. After that, the adjusting nut 27 having C-shaped section is mounted laterally in the same way as being mentioned formerly, then the cable cap and the guide pipe 49 are fixed with nipping the adjusting nut 27 by tightening the semi-box nut 9.

In the above procedure for duplex steering mechanisms, the adjusting nut without having a cutting can be used instead of the one having C-shaped section. For instance, in the assembly work, the adjusting nut without having a cutting can be used by mounting it prior to the connecting work of the inner cable and the core rod or fixing work of the core rod and the hollow cylindrical part, although the outside diameter of the adjusting nut is larger than the inside diameter of the guide pipe and it cannot pass through the guide pipe. However, after the above connection work and fixing work are completed, it is not easy to dismounting the adjusting nut. Because of that, the pulling out work of the push-pull control cable from duplex steering mechanisms and consequently the disassemble work thereof is somewhat difficult.

While, the use of the adjusting nut having C-shaped section has an advantage that the disassembly work of the steering apparatus after the completion of the assembly work thereof becomes easy.

Figure 8:
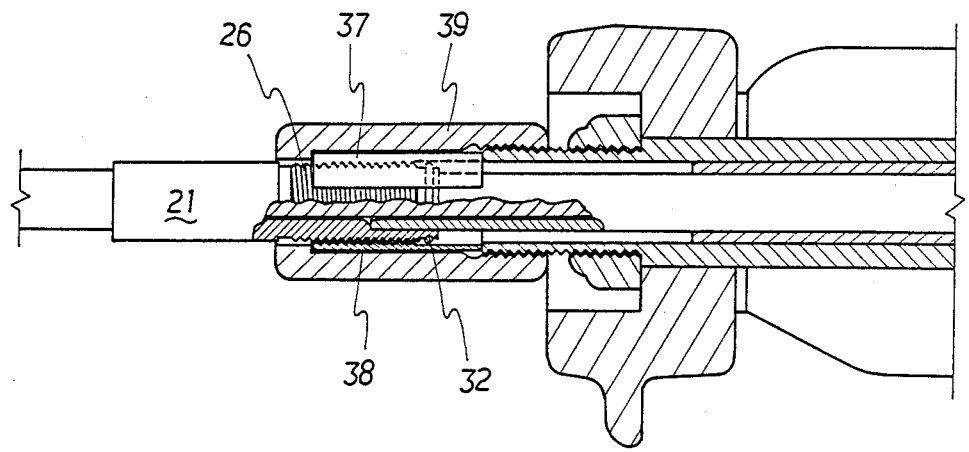
FIG. 8 is a sectional view showing an important part of another embodiment of a steering apparatus of the present invention.

Next, another embodiment of the present invention is explained using FIG. 8. In this embodiment, there are used an adjusting nut 37 having a longer length than the one on the former embodiment and a semi-box nut 39 having a longer length. A male-threaded surface 26 of a cable cap 21 can be longer as well as the adjusting nut, but also can be shorter. A female-threaded surface 38 inside the adjustig nut 37 can be prepared throughout the length of the adjusting nut 37, but also can be prepared partially, for instance, only at the rear end part. In case that the adjusting nut 37 is engaged to the male-threaded surface 26 of the cable cap 21 by the female-threaded surface 38 being partially prepared only at the rear end part, the front edge of the adjusting nut 37 can project over the edge of the cable cap 21. The longer adjusting nut 37 and/or the longer semi-box nut of this embodiment can be used as optional parts for the adjusting nut (27 in FIG. 1a) in the former embodiment to extend the range of adjustable length.

In a steering apparatus for a boat of the present invention, a steering apparatus can be applied to different types of boats, the adjustment of straight-forward positions of a steering wheel and a rudder is easy, and the compensation of the individual behavior in straightforward characteristic is also easy. Further the water resistant construction can be easily provided by fitting an O-ring on a front end surface of a cable cap, and still further, assembly work and disassembly work of steering mechanisms particuarly of duplex steering mechanisms are easy.

Though, a few embodiments have been explained with reference to the accompanying drawings, it is to be understood that the present invention is not limited to the embodiments mentioned above, and various changes and modifications may be made in the invention without departing from the spirit and scope thereof.

What we claim is:

1. A steering apparatus for a boat comprising
   (a) an operating means;
   (b) a control cable comprising an inner cable driven to be pushed or pulled by operation of said operating means, and a conduit for slidably guiding said inner cable;
   (c) a steering mechanism having, a steering link to be connected to an end of said inner cable and a rudder means driven by said steering link;
   (d) a guide pipe having an end fitting and being provided in said steering mechanism into which said inner cable is inserted and which slidably guides said inner cable;
   (e) a cable cap having a male-threaded surface on its outside near an end thereof fixed at an end of said conduit;
   (f) an adjusting nut to be engaged with said male-threaded surface of said cable cap so as to move axially by being turned; and
   (g) a semi-box nut having a hollow for enclosing said adjusting nut, having an annular bottom for catching said adjusting nut, having a female-threaded surface inside near its open end so as to be engaged with a male-threaded surface of said end fitting of said guide pipe while nipping said adjusting nut.

2. The steering apparatus for a boat of claim 1, wherein a steering rod is provided for connecting said inner cable to said steering link, a fixed guide pipe is fixed at the free end of said cable cap for slidably guiding said steering rod, and said adjusting nut has a C-shaped section which is partially cut off to have an enough opening to be mounted laterally on said fixed guide pipe.

3. The steering apparatus for a boat of claim 2, wherein an additional steering mechanism is provided in such manner that said push-pull control cable is layed through a guide pipe of said additional steering mechanism, said additional steering mechanisms includes an additional rudder means and said conduit of said push-pull control cable is connected to an edge of said guide pipe of said steering mechanism, and said rudder means and said additional rudder means are connected by a connecting link to provide an interlocked operation.

* * * * *